F. Angilard,
Fish Hook.
No. 68,027. Patented Aug. 27, 1867.
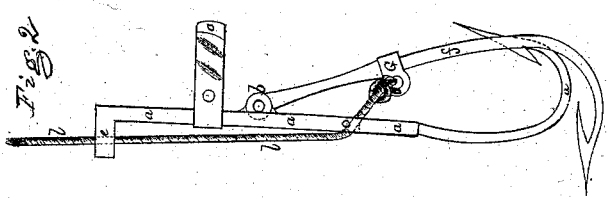
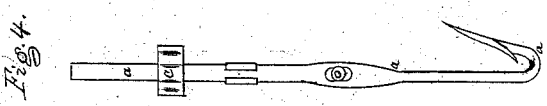
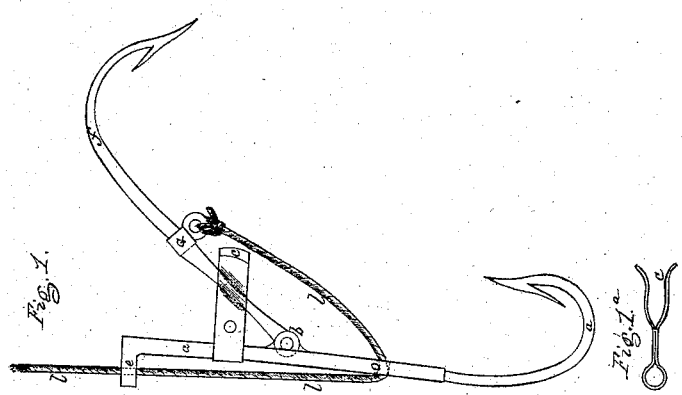
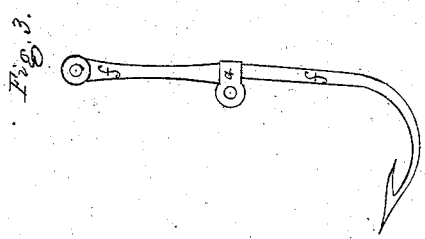
Witnesses.
Signature.
Francis Angilard

United States Patent Office.

FRANÇOIS ANGILARD, OF ROYAN, FRANCE.

Letters Patent No. 68,027, dated August 27, 1867.

---

IMPROVEMENT IN FISH-HOOKS.

---

The Schedule referred to in these Letters Patent and making part of the same.

---

TO ALL WHOM IT MAY CONCERN:

Be it known that I, FRANÇOIS ANGILARD, of Royan, in the department of Charente Inferieure, in the Empire of France, have invented certain new and useful Improvements in Fishing-Hooks; and I do hereby declare that the following is a full and exact description thereof.

My hook has two branches, peculiarly arranged, and operating together in such a manner that a pull on the lower or main hook draws down the upper branch or auxiliary hook so as to cause both hooks to engage the fish. The upper branch is held in position until the fish bites by means of a spring-clamp having just sufficient force to resist the weight and the ordinary agitation of the hook, but opposing so slight a resistance to the descent of the upper branch that it is operated the instant any sensible pull is made, either by the action of the fish in drawing downward on the hook or by the action of the fisherman in pulling upward on the line.

I will first proceed to describe what I consider the best means of carrying out my invention, and will afterwards designate the points which I believe to be new. The accompanying drawings form a part of this specification.

Figure 1 represents the entire hook set in a position for fishing.

Figure 1 $a$ is a view of the spring-catch detached.

Figure 2 represents the hook with the two branches in the position which they tend to assume after a fish has bit.

Figure 3 is a side view of the upper branch detached.

Figure 4 is an edge view of the lower branch with the spring attached.

Similar letters of reference indicate like parts in all the figures.

The lower branch or main hook is represented by $a$. Its upper extremity has a short offset or bent end, in which a hole, $e$, is produced. The line $l$ is rove through this hole $e$, extended down, and rove through another hole, $o$, in the shank of the hook, and is thence extended upward to be attached to the upper branch in the manner represented. The upper branch is represented by $f$. It is hinged to the main hook $a$ by the rivet $b$, and receives the line by means of the eye $g$, and is supported in the elevated position by means of the spring-clamp $c$, all very clearly represented in the drawings.

The bait is fixed on the main hook $a$ in the manner which will be obvious. On the fish seizing it, the pull on this hook down, or on the line $l$ upward, or on both at the same moment, draws down the upper hook, the line $l$ pulling through the hole $o$ in the manner of a pulley, as will be obvious. The fish thus caught between the points of the two hooks is pretty certain to be retained. On securing the fish the hooks are disengaged in the ordinary manner, and reset in the position indicated in fig. 1; after which the bait is again adjusted, and the hook is again carefully lowered into the water.

Having now fully described my invention, what I claim as new, and desire to secure by Letters Patent, is as follows:

1. I claim, in fish-hooks, the arrangement of the line $l$ and holes $e\ o$, relatively to the two branches $a\ f$, jointed together at the point $b$ above the hole $o$, substantially as and for the purpose herein specified.

2. I claim, in connection with the above, the spring-catch $c$, arranged as specified, adapted to hold up the hinged branch $f$ of a double-branched fish-hook, and to release it with a very slight pull on the line $l$, substantially as and for the purpose herein specified.

In testimony whereof I have hereunto set my name in presence of two subscribing witnesses.

ANGILARD FRANÇOIS.

Witnesses:
GAILLARD.
G. BARAL, Jr.